United States Patent

Mountz

(10) Patent No.: US 6,748,292 B2
(45) Date of Patent: Jun. 8, 2004

(54) MATERIAL HANDLING METHOD USING AUTONOMOUS MOBILE DRIVE UNITS AND MOVABLE INVENTORY TRAYS

(75) Inventor: Michael C. Mountz, Palo Alto, CA (US)

(73) Assignee: Distrobot Systems, Inc., Burlington, MA (US)

( * ) Notice: Subject to any disclaimer, the term of this patent is extended or adjusted under 35 U.S.C. 154(b) by 0 days.

(21) Appl. No.: 10/357,623

(22) Filed: Feb. 3, 2003

(65) Prior Publication Data

US 2004/0010337 A1 Jan. 15, 2004

Related U.S. Application Data

(63) Continuation-in-part of application No. 10/196,772, filed on Jul. 15, 2002.

(51) Int. Cl.$^7$ ................................................ G06F 7/00
(52) U.S. Cl. .................. 700/214; 700/216; 700/245; 700/248; 701/23; 701/213
(58) Field of Search ........................ 700/213, 214, 700/245, 216, 113, 248; 701/1, 2, 23, 213, 301, 300

(56) References Cited

U.S. PATENT DOCUMENTS

| | | |
|---|---|---|
| 4,542,808 A | 9/1985 | Lloyd, Jr. et al. |
| 4,678,390 A | 7/1987 | Bonneton et al. |
| 4,716,530 A | 12/1987 | Ogawa et al. ................. 701/23 |
| 4,780,817 A | 10/1988 | Lofgren ........................ 701/23 |
| 4,789,940 A * | 12/1988 | Christian ..................... 700/113 |
| 4,996,468 A | 2/1991 | Field et al. |
| 5,179,329 A | 1/1993 | Nishikawa et al. |
| 5,187,664 A | 2/1993 | Yardley et al. ............... 701/23 |
| 5,228,820 A | 7/1993 | Stansfield et al. |
| 5,283,739 A | 2/1994 | Summerville et al. ........ 701/23 |
| 5,362,197 A | 11/1994 | Rigling |
| 5,395,199 A | 3/1995 | Day, III et al. |
| 5,434,490 A | 7/1995 | Ishida et al. |
| 5,568,030 A * | 10/1996 | Nishikawa et al. .......... 318/587 |
| 5,652,489 A | 7/1997 | Kawakami |
| 5,663,879 A | 9/1997 | Trovato et al. ................. 701/2 |
| 5,793,934 A | 8/1998 | Bauer |
| 5,800,777 A | 9/1998 | Jehan |
| 5,801,506 A | 9/1998 | Netzler |
| 5,819,008 A * | 10/1998 | Asama et al. ................ 700/255 |
| 5,825,149 A * | 10/1998 | Matsumoto et al. ......... 318/587 |
| 5,825,981 A * | 10/1998 | Matsuda ..................... 700/248 |
| 5,928,952 A | 7/1999 | Hutchins et al. |
| 5,933,394 A * | 8/1999 | Kim ............................ 386/126 |
| 6,049,745 A * | 4/2000 | Douglas et al. ................ 701/23 |
| 6,061,607 A | 5/2000 | Bradley et al. |
| 6,208,908 B1 | 3/2001 | Boyd et al. |
| 6,317,648 B1 | 11/2001 | Sleep et al. |
| 6,339,764 B1 | 1/2002 | Livesay et al. |
| 6,351,685 B1 | 2/2002 | Dimitri et al. |
| 6,356,838 B1 | 3/2002 | Paul |
| 6,421,579 B1 | 7/2002 | Dimitri et al. |
| 6,463,360 B1 | 10/2002 | Terada et al. ................ 700/257 |
| 6,463,460 B1 * | 10/2002 | Simonoff ..................... 709/203 |
| 2002/0063225 A1 | 5/2002 | Payton |

* cited by examiner

Primary Examiner—Khoi H. Tran
(74) Attorney, Agent, or Firm—Baker Botts L.L.P.

(57) ABSTRACT

An inventory system includes a plurality of mobile drive units with a processor control and with a positioning system that enables the mobile drive units to navigate a factory floor. The mobile drive units interface with a material handling system to receive order requests and deliver inventory items to pack stations located on the factory floor. The inventory items are stored in trays stacked into movable inventory pods, which may be transported by the mobile drive units throughout the factory floor. The mobile drive units dock and undock with the movable inventory pods using a docking mechanism. The movable inventory pods are stored in a virtual storage grid when they are not being transported by the mobile drive units. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

53 Claims, 16 Drawing Sheets

MATERIAL HANDLING METHOD USING AUTONOMOUS MOBILE DRIVE UNITS AND MOVABLE INVENTORY TRAYS

RELATED APPLICATIONS

This is a continuation-in-part (CIP) application of application Ser. No. 10/196,772 filed Jul. 15, 2002, entitled, "Material Handling System and Method Using Mobile Autonomous Inventory Trays and Peer-to-Peer Communications."

FIELD OF THE INVENTION

The present invention relates generally to the field of material handling; more particularly, to systems and methods of material handling using autonomous mobile drive units and movable inventory trays.

BACKGROUND

The order fulfillment step in the distribution system process is often one of the largest cost components in moving inventory from production to end consumer. This is due to the fact that final order assembly is typically labor intensive and time consuming as operators move among inventory locations and manually handle items. The order fulfillment step involves selecting multiple individual inventory items from among a large assortment of possible items. In contrast, the steps prior to the order fulfillment step in the distribution system process are generally more efficient since they handle inventory in bulk operations such as moving a truckload at a time, a full pallet of one product, or even whole cases.

Due to its large labor costs, order fulfillment operations have long been the focus of innovations designed to reduce labor. These developments have taken the form of pick-to-light technology, wireless barcode readers, conveyor systems that move orders to operators and even automated storage and retrieval systems ("ASRS") that bring the inventory to the worker. Common ASRS solutions are sometimes called carousels or stockers. A typical carousel may have several thousand storage bins installed in a rotating structure that operates similar to the spinning clothes rack at a dry cleaning facility. Another type of solution known as a sorter is used in conjunction with inventory storage equipment and comprises a revolving tray mechanism that helps sort items coming from inventory into their target order bins. Yet another solution is to provide fixed racking aisles served by a gantry robot that moves in and out of the aisles to bring inventory to the front of the storage system.

These solutions have been embraced by the distribution industry for their ability to streamline operations and cut operating costs. Yet even with these often expensive systems, fulfillment costs remain high and distribution system managers continue to search for ways to reduce operating costs.

Another major shortcoming of the current set of order fulfillment solutions is complexity. These automated systems often involve complex control software, lengthy installation, integration and bring-up time, and fail to perform robustly over long periods. Current solutions must be monitored, tuned, and managed by experts with sophisticated knowledge of the system's workings. In addition, these systems are often inflexible to new processes that may be required as an organization's needs change.

What is needed is an order fulfillment system that is simple to install, operate, and maintain, and that would further reduce operating costs.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
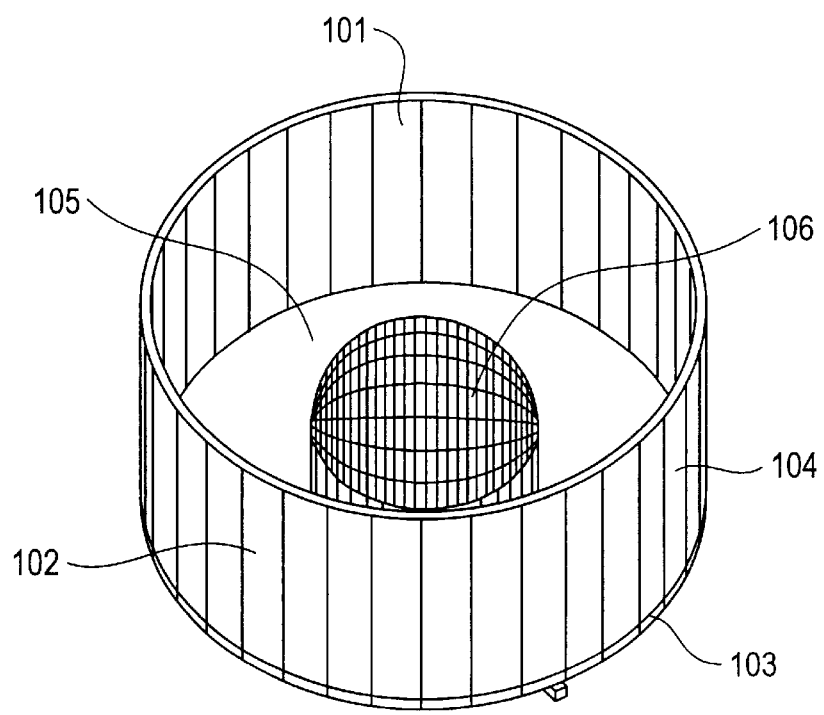
FIG. 1 is a top perspective view of a mobile inventory tray according to one embodiment of the present invention.

A material handling system and method using mobile autonomous inventory trays and peer-to-peer communications is disclosed. In the following description numerous specific details are set forth, such as the particular configuration of mobile inventory trays, the use of mobile inventory trays on a factory floor, and details regarding communication technologies, etc., in order to provide a thorough understanding of the present invention. However, persons having ordinary skill in the material handling arts will appreciate that these specific details may not be needed to practice the present invention.

According to an embodiment of the present invention, autonomous mobile inventory trays, which are robotic devices, are used to extend the concept of bringing a storage location to an operator (e.g., person, robot, etc.) in a novel way. Inventory is stored in mobile trays that can move in any direction under their own power within an established storage area of an organization (e.g., a factory floor). There are no predetermined storage locations for the mobile inventory trays other than that they exist somewhere within a designated space (e.g., an enclosed factory floor). The mobile inventory trays are free to move in any direction necessary including up and down ramps to other inventory floor levels. In this manner, the mobile inventory trays can respond to pick requests and move to pack station locations as part of the pick-and-pack order filling process. The mobile inventory trays may communicate with each other via radio frequency ("RF") technology (e.g., the Bluetooth wireless protocol link) or other types of peer-to-peer communication. The mobile inventory trays may use a pseudo-lite indoor global positioning system ("GPS") to provide themselves with an accurate position of their location within the predefined inventory storage area. Alternate positioning technologies may also be used such as 802.11-based localization technology or Ultra Wide Band (UWB) signaling based location technology. The mobile inventory trays may then use this information to calculate routes to a pack station, and their peer-to-peer communications ability to coordinate clear paths on the factory floor, or to queue with other trays at control nodes.

The mobile inventory trays of the present invention are thus automatic unguided vehicles (an "AUV") rather than automatic guided vehicle (an "AGV"). They are able to navigate the factory floor autonomously using information obtained from the on-board GPS and RF communication systems without any guidance assistance from a remote central computer. This system of mobile inventory trays is self-tuning and self-optimizing. Frequently requested trays migrate closer to the pack stations, while trays containing slower moving inventory items drift back and to the sides and may even move to upper levels. In this sense, the material handling system and method of the present invention is a complex adaptive system and demonstrates emergent system behavior.

As with all material handling systems, the autonomous storage and retrieval system and method of the present invention may integrate with existing warehouse management software ("WMS") systems. For example, order requests may be made from a WMS to the material handling system ("MHS") and relayed to the appropriate pack station computers which then direct the order fulfillment from inventory brought to the pack stations utilizing the mobile inventory trays. Orders may be processed in parallel, i.e., multiple orders may be filled simultaneously at a given pack station and multiple pack stations can operate concurrently. Parallel processing of orders allows for real-time fulfillment of orders, in that multiple orders may be filled in minutes rather than in hours. Operators pick the inventory items from the arriving trays, place the items in the order container and, when the order is complete, the pack station computer relays this information to the MHS which in turn notifies the WMS.

Referring now to FIG. 1 there is shown a perspective view of a mobile inventory tray 101 according to one embodiment of the present invention. Mobile inventory tray 101 is designed so that it may move autonomously on a surface, such as a factory floor (not shown in this view). Although mobile inventory tray 101 may be specifically discussed in reference to its movement on a factory floor, it should be noted that mobile inventory tray 101 may be used in a variety of capacities including those typified by pick-and-pack operations, order fulfillment operations, or assembly line operations where a few items are drawn from a large population of possible items. An example of such an operation is where a single item is drawn from a large population of books, movies, food supplies, subsystem parts, etc.

Mobile inventory tray 101 comprises an enclosure 102 to contain various inventory items (not show in this view). In the embodiment illustrated by FIG. 1, the enclosure is a circular, one-piece assembly container having a base or bottom wall 103 and a side wall 104 extending upwardly from the bottom wall 103 to create a compartment 105 for the inventory items. It should be noted that the mobile inventory tray does not necessarily need to be circular, as is shown in FIG. 1. The design of the mobile inventory tray 101 may vary in size and shape based on the type of inventory items the factory stores. Mobile inventory tray 101 also contains a housing 106 for its drive system and control electronics which will be described in more detail later.

Figure 2A:
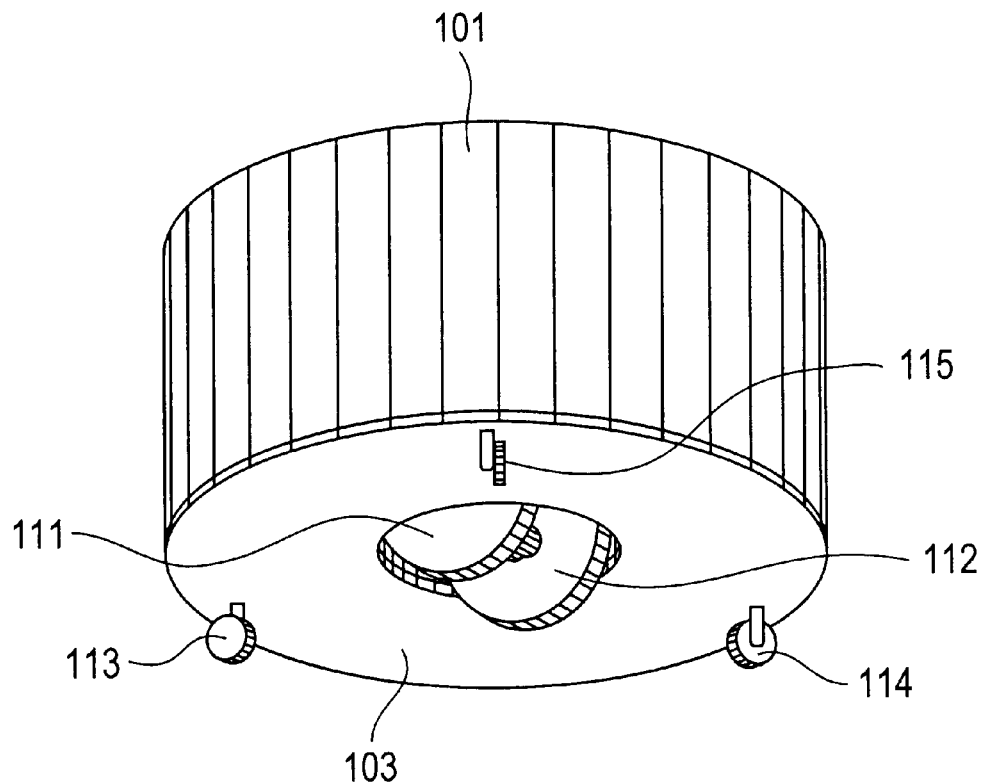
FIG. 2A is a bottom perspective view of a mobile inventory tray according to one embodiment of the present invention.

Referring now to FIG. 2A there is shown a bottom perspective view of a mobile inventory tray 101. Two driving wheels 111 and 112 and three small freely-rotating casters 113–115 are shown mounted to the base 103 of the mobile inventory tray 101. The driving wheels 111 and 112 are operated by motors (not shown in this view) located in the housing 106 of mobile inventory tray 101. The drive wheels 111 and 112 always remain in contact with the factory floor. Casters 113–115 function to support the load and maintain mobile inventory tray 101 in rolling contact with the floor despite imbalances in the items contained in enclosure 102. The motors may be attached to the driving wheels 111 and 112 in a conventional manner.

Figure 2B:
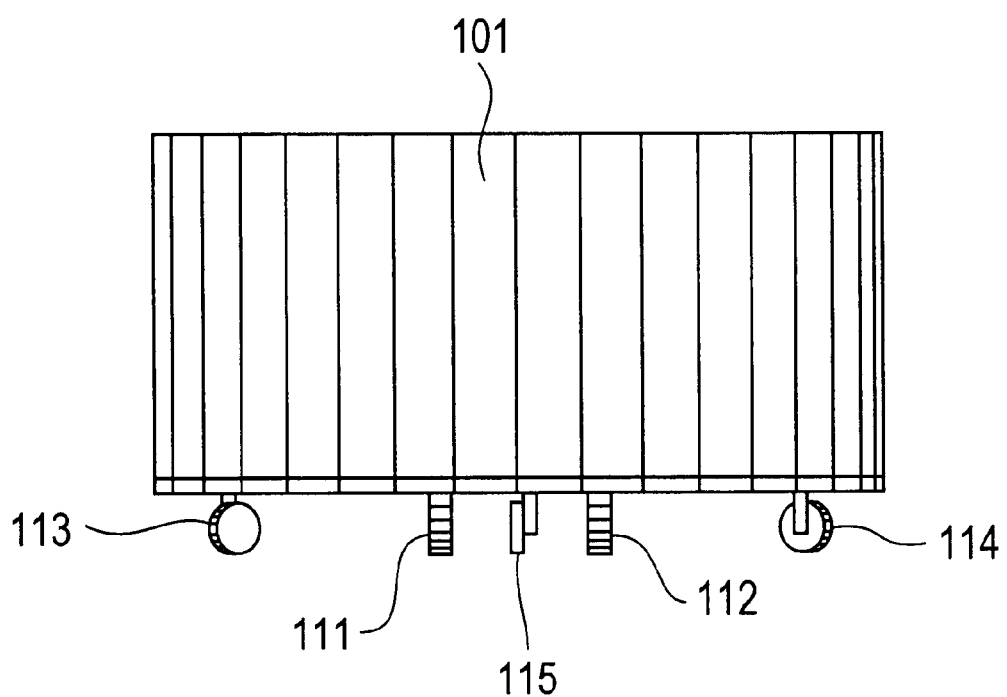
FIG. 2B is a front side view of the mobile inventory tray of FIG. 2A.

FIG. 2B is a front side view of the mobile inventory tray of FIG. 2A. Casters 113–115 roll freely and balance the mobile inventory tray 101 as it moves along a surface (not shown in this view) by using the driving wheels 111 and 112. It should be noted that the mobile inventory tray 101 may use other locomotion means as well, including motor driven tracks, propellers, ball-wheels or a combination of locomotion devices.

Figure 3:
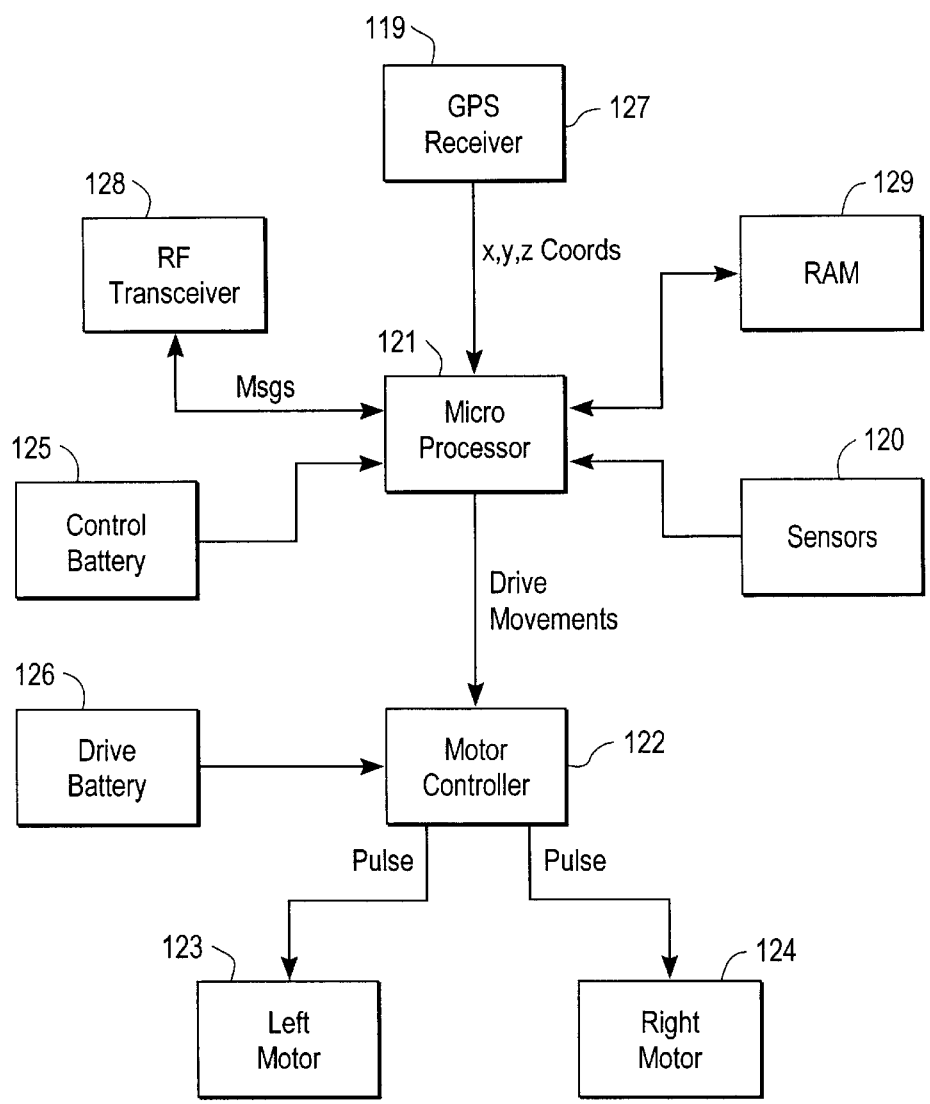
FIG. 3 is a high-level system block diagram of tray subsystems according to one embodiment of the present invention.

FIG. 3 is a high-level block diagram of the subsystems of a mobile inventory tray according to one embodiment of the present invention. The mobile inventory tray subsystem may be implemented as a computer-based (i.e., microprocessor-based) device. For instance, all of the elements shown in FIG. 3 may be contained within housing 106 (see FIG. 1) secured to the mobile inventory tray.

A motor controller 122 controls the movement of the mobile inventory tray in response to drive movement commands received from microprocessor 121. Motor controller 122 is coupled to provide pulse signals to a left motor 123 and a right motor 124. The motors 123 and 124 are coupled to the drives wheels (see FIG. 1) which propel the mobile inventory tray forward and backward in response to the signals provided by controller 122. A control battery 125 and a drive battery 126 provide the electrical power for operating the electrical systems 122 and drive motors 123 and 124. The mobile inventory tray may move to and couple with charging stations (not shown) as needed to replenish the battery power.

Microprocessor 121 of the mobile inventory tray subsystem 119 provides the intelligence for the mobile inventory tray. A random-access ("RAM") 129 memory may be included to provide memory storage and as a source of data. A global positioning system ("GPS") receiver 127, radio frequency ("RF") communication transceiver 128, and sensors 120 provide signals to microprocessor 121. For example, GPS receiver 127 outputs position coordinates (x, y, z), while transceiver 128 provides command and other messages, and sensors 120 provide signals to microprocessor 121. Sensors may include infrared, optical, acoustic, contact, laser, sonar, magnetic, etc. common to mobile robotic vehicles for the purpose of identifying obstacles, avoiding collisions, finding edge limits etc. Microprocessor 121 may also send information (e.g., location, status, diagnostics, etc.) to a remote receiver utilizing transceiver 128.

As the mobile inventory tray moves about the factory floor it may provide itself with an accurate position of its location at all times using the GPS receiver 127. The GPS receiver 127 or equivalent system receives signals for determination of its position coordinates. This position information may include geographic longitude and latitude, as well as the height above normal zero or Cartesian coordinates in a manner that is commonly known. Those skilled in the art will appreciate that other guidance methods and systems including radar-based inertial navigation using gyroscopes, laser triangulation, cell-based locator logic (e.g., such as the emergency 911 positioning technology), and visual referencing may also be used by the mobile inventory tray to determine its position coordinates. The mobile inventory tray utilizes the position coordinates obtained from the GPS receiver 127 to calculate routes on the factory floor. It may also utilize position information when navigating to clear paths or queue with other mobile inventory trays, as will be described in detail shortly.

The mobile inventory tray may communicate its position and other data (e.g., the content of its inventory, its destination pack station, etc.) in a peer-to-peer fashion to other mobile inventory trays using RF communication as provided through receiver 128. In the embodiment illustrated by FIG. 3, a short-range communications medium such as a Bluetooth wireless protocol link or an ordinary infrared communication link may be used to provide a direct wireless link between mobile inventory trays. It should be understood that various wireless and terrestrial communications technologies may be employed. For example, the mobile inventory tray may be equipped with a device for communicating using the Global System for Mobile Communications ("GSM") protocol, the General Packet Radio Service ("GPRS") protocol, the 802.11b Wi-Fi networking protocol, and/or any other communication protocol/standard capable of communicating data. In a two-way mode of operation, transceiver 128 is equipped with an interface for both receiving and transmitting data over the direct wireless link. The wireless link may also communicate with the material handling system ("MHS") (not shown in this view) which interfaces with the individual mobile inventory trays. In this manner, the mobile inventory trays may be directed to various check-in stations and/or pack stations to process orders requested by the MHS. The mobile inventory tray may use the RF communication system provided by transceiver 128 and the GPS receiver 127 to navigate to appropriate check-in stations and/or pack stations.

Figure 4A:
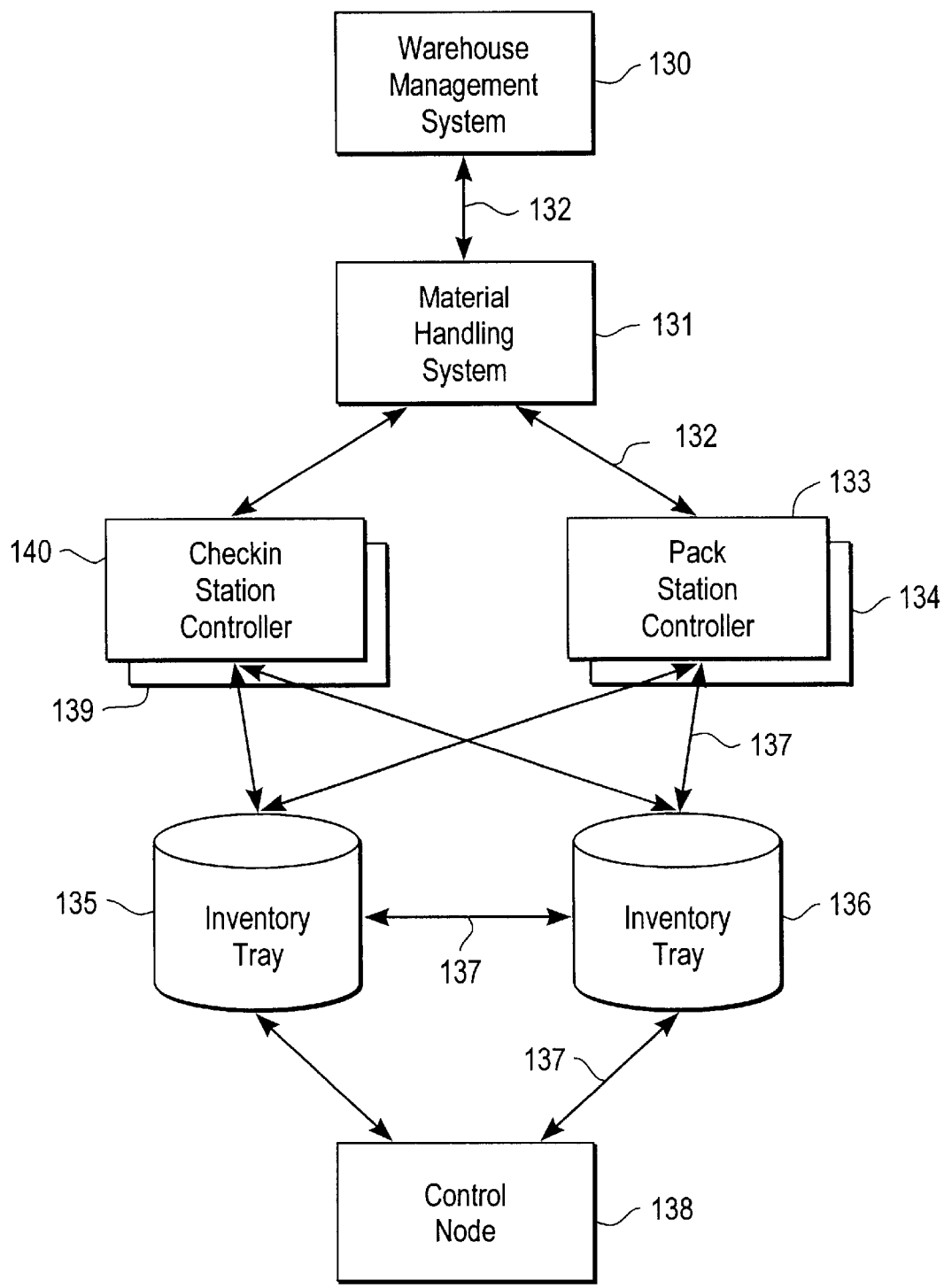
FIG. 4A is a block diagram of a system interface to a warehouse management system according to one embodiment of the present invention.

Referring now to FIG. 4A there is shown a block diagram of a system interface to a WMS 130 according to one embodiment of the present invention. The WMS 130 comprises a host computer that communicates data such as a production order (i.e., a request for an item(s) of inventory) to a Materials Handling System ("MHS") 131. The WMS 130 may be implemented as any one of a number of well known systems used to manage inventory in a factory or warehouse. WMS 130 transmits orders for shipments, tracks receipts, monitors factory inventory, etc. The WMS 130 transmits the request for the item(s) of inventory to the MHS 131 through a network connection, such as an intranet network 132. It should be noted that a variety of wireless and/or terrestrial communications technologies may also be used to transmit this request, including a wide area network ("WAN"), a local area network ("LAN"), or any other system of interconnections enabling two or more computers to exchange information. The MHS 131 then transmits the data using the above network connection methods to one or more pack station controllers 133, 134, etc. In turn, the pack station controller 133, 134, etc., wirelessly transmits the data request for the item(s) of inventory to one or more of the mobile inventory trays 135, 136 via a communication device in the pack station controller 133, 134, etc., using an RF link 137.

There may be multiple mobile inventory trays 135, 136, etc., moving about on a factory floor, with each mobile inventory tray 135, 136, etc., carrying a particular item(s) of inventory. Note, that in certain implementations, it is also possible for a single mobile inventory tray to carry multiple different types of inventory items in order to reduce the overall number of trays needed in the system. When the request for an item(s) of inventory is received by one or more mobile inventory trays 135, 136, etc., the mobile inventory trays transmit the request to peer mobile inventory trays 135, 136, etc. using the RF link 137. In a matter of seconds (or in a smaller increment of time), every mobile inventory tray 135, 136, etc., has received the request. Mobile inventory trays 135, 136, etc., containing the requested items(s) of inventory are instructed by their microprocessor 121 (see FIG. 3) to move to the pack station controller 133, 134, etc., all the while locating themselves on the factory floor with their GPS (not shown in this view). During movement, the mobile inventory trays 135, 136, etc. may also communicate with other control nodes 138 such as charging stations, obstacle markers, ramp markers, etc. using the RF link 137. When mobile inventory trays 135, 136, etc., arrive at the pack station controller 133, 134, etc., an operator (e.g., a human, a robot, etc.) removes the requested inventory item(s) from the mobile inventory trays 135, 136, etc. Pack station controller 133, 134, etc., tracks inventory item(s) requests as they are satisfied. This tracking function may be performed by scanning a barcode affixed to the inventory item(s). Pack station controller 133, 134, etc., communicates with the microprocessor 121 on mobile inventory trays 135, 136, etc., so that once an order is satisfied (e.g., requested item(s) is removed from the mobile inventory trays 135, 136, etc., and scanned by the barcode scanner) the mobile inventory trays 135, 136, etc., are released so that they may again move about the factory floor to fill other orders. The pack station controller 133, 134, etc., may also communication with the MHS 131 via the intranet network 132 or via some other wireless and/or terrestrial link, which in turn communicates with the WMS so that it may also track when order requests have been satisfied.

It should be noted that each mobile inventory tray 135, 136, etc., receives a supply of a particular item(s) of inventory at one or more check-in station(s) 139, 140, etc., where pallets may arrive from vendors on a regular basis. An operator at the check-in station 139, 140 etc. removes items of inventory from the pallets and places the items in the mobile inventory tray 135, 136, etc. For example, mobile inventory tray 135 may carry tubes of toothpaste while mobile inventory tray 136 may carry cartons of milk. Mobile inventory trays 135, 136, etc. know to move themselves to a check-in station 139, 140, etc. to replenish their inventory item(s) as they are depleted. When depleted, the empty mobile inventory tray may take on any new inventory item as determined by the operator at the check-in station. Mobile inventory trays 135, 136, etc., may also receive requests from the MHS 131 to move to check-in station 139, 140, etc. as more pallets arrive.

Figure 4B:
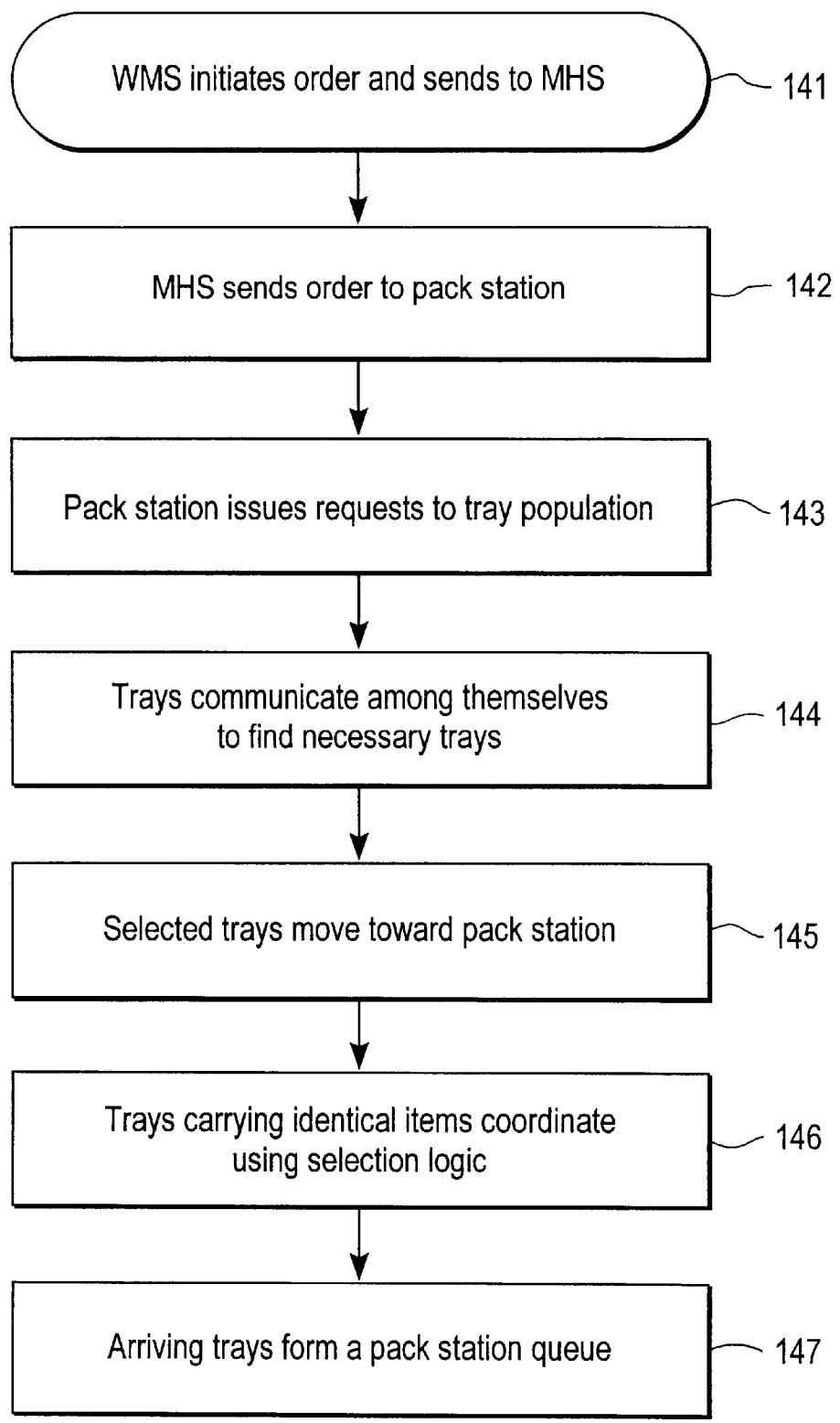
FIG. 4B is a flow chart showing the steps of an order fulfillment process using mobile inventory trays.

Another embodiment of the present invention provides for giving inventory certain intelligence. According to this embodiment, as depicted by FIG. 4B, not only can the pack station controller 143 communicate with the inventory, the inventory can also essentially communicate with other inventory via mobile inventory trays. FIG. 4B is a flow chart showing the steps of an order fulfillment process using mobile inventory trays interfacing with each other and with the material handling system of FIG. 4A. In one embodiment, an order (e.g., for bread and milk) is transmitted from the WMS 141 to the MHS. The MHS 142 then relays this order to a pack station controller. The pack station controller 143 transmits the order to mobile inventory trays using an RF link. The mobile inventory trays then communicate among themselves to locate the trays that contain the requested inventory items 144. When a tray does not contain a requested item it relays the request to peer trays. (e.g., "I do not have bread, but does anyone else have bread?"). The system relays the request all the way across the factory floor in this fashion. In a matter of seconds, every mobile inventory tray that contains requested items begins moving toward the pack station controller 145. As mobile inventory trays containing requested items move toward the pack station, other mobile inventory trays which are not part of this order coordinate to move aside. If two mobile inventory trays attempting to fill the same item request come within a short range of each other (e.g., 30 feet), they may communicate to determine who should fill the order 146. One mobile inventory tray may state that it has two loaves of bread, and another mobile inventory tray may state that it has five loaves. Then according to embedded tray selection algorithms, one tray moves aside and the other tray continues to move toward the pack station, because it is the optimum mobile inventory tray to fill the order. In this manner, the system is not only self-regulating but also self-optimizing in that item(s) of inventory that are requested more often drift closer to the pack station for more rapid response on subsequent order requests. As mobile inventory trays arrive at pack station, they communicate with each other to form an orderly queue 147 so that an operator can remove the requested items.

Figure 5:
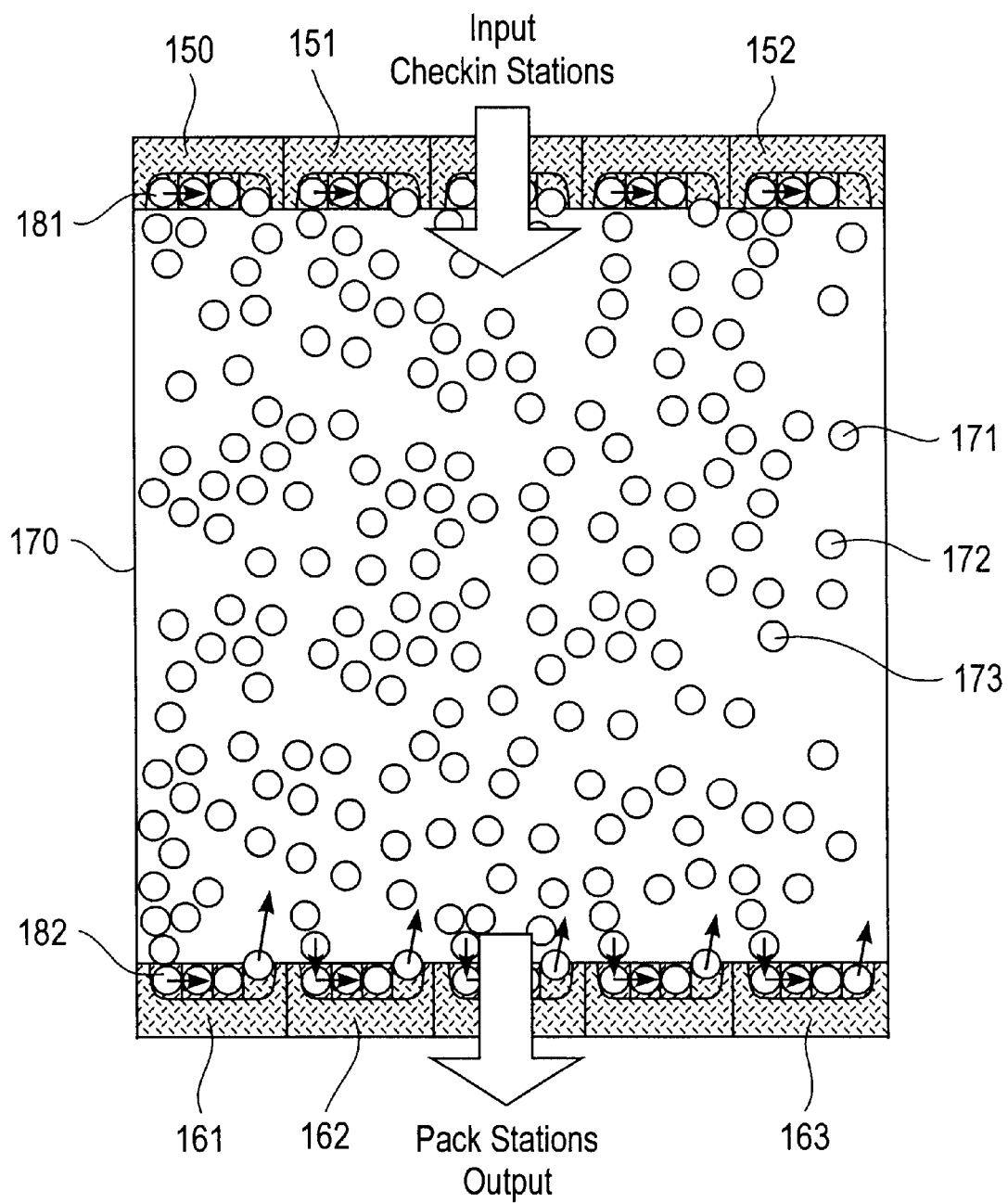
FIG. 5 is a top view of mobile inventory trays located on a factory floor according to one embodiment of the present invention.

Referring now to FIG. 5 there is shown a top view of multiple mobile inventory trays located on a factory floor according to one embodiment of the present invention. According to the embodiment illustrated by FIG. 5, check-in stations 150, 151, 152, etc., and pack stations 161, 162, 163, etc., are located on opposite sides of a factory floor 170. It should be noted that the configuration of the factory floor 170 and the location of the check-in stations 150, 151, 152, etc., and the pack stations 161, 162, 163, etc., in relation to the factory floor 170 may change depending on a variety of considerations (e.g., size and quantity of the inventory item(s) processed, types of inventory item(s), size of the factory floor, etc.). Mobile inventory trays 171, 172, 173, etc., are free to move about the factory floor 170 in any direction using the propulsion means disclosed above (see FIGS. 1 and 2). The mobile inventory trays 171, 172, 173, etc., may be directed to various check-in stations 150, 151, 152, etc., and/or pack stations 161, 162, 163, etc., to fill order requests by the MHS (not shown in this view). The mobile inventory trays 171, 172, 173, etc., form orderly queues as they enter the input areas 181, 182 of the check-in stations 150, 151, 152, etc., and/or pack stations 161, 162, 163, etc. Operators (not shown in this view) move inventory item(s) (not shown in this view) into and out of the mobile inventory trays 171, 172, 173, etc., as the mobile inventory trays move through the check-in 150, 151, 152, etc. and pack stations 161, 162, 163, etc.

Figure 6:
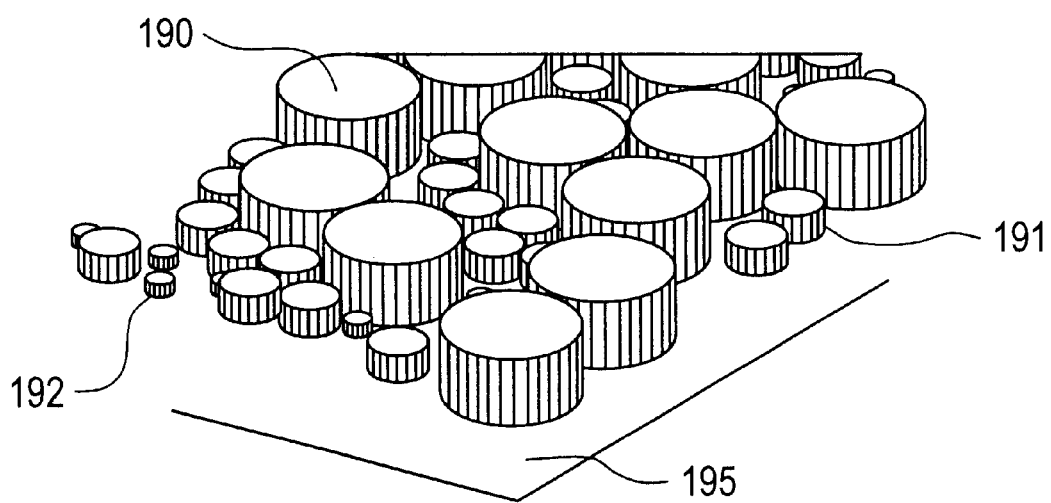
FIG. 6 is a perspective view of mobile inventory trays located on a factory floor according to one embodiment of the present invention.

Referring now to FIG. 6 there is shown a perspective view of multiple mobile inventory trays located on a factory floor according to one embodiment of the present invention. The mobile inventory trays 190, 191, 192, etc., may be of varying sizes and shapes. As shown in FIG. 6, the mobile inventory trays 190, 191, 192, etc., are circular and vary in size and shape. Mobile inventory trays 190, 191, 192, etc., may also be customized to transport specialty items (e.g., items that require special care). There are no predetermined storage locations for the mobile inventory trays 190, 191, 192, etc., other than that they exist somewhere within the designated inventory storage area on a factory floor 195. This is due to the fact that the mobile inventory trays 190, 191, 192, etc., are "smart" trays. They direct themselves wherever they need to be on the factory floor 195. As described herein, the location of the mobile inventory trays 190, 191, 192, etc., is not tracked, assigned, or controlled, until they are directed to a pack station or a check-in station (not shown in this view). In this sense, the material handling system and method of the present invention provides for a location-less inventory storage and retrieval system.

Figure 7:
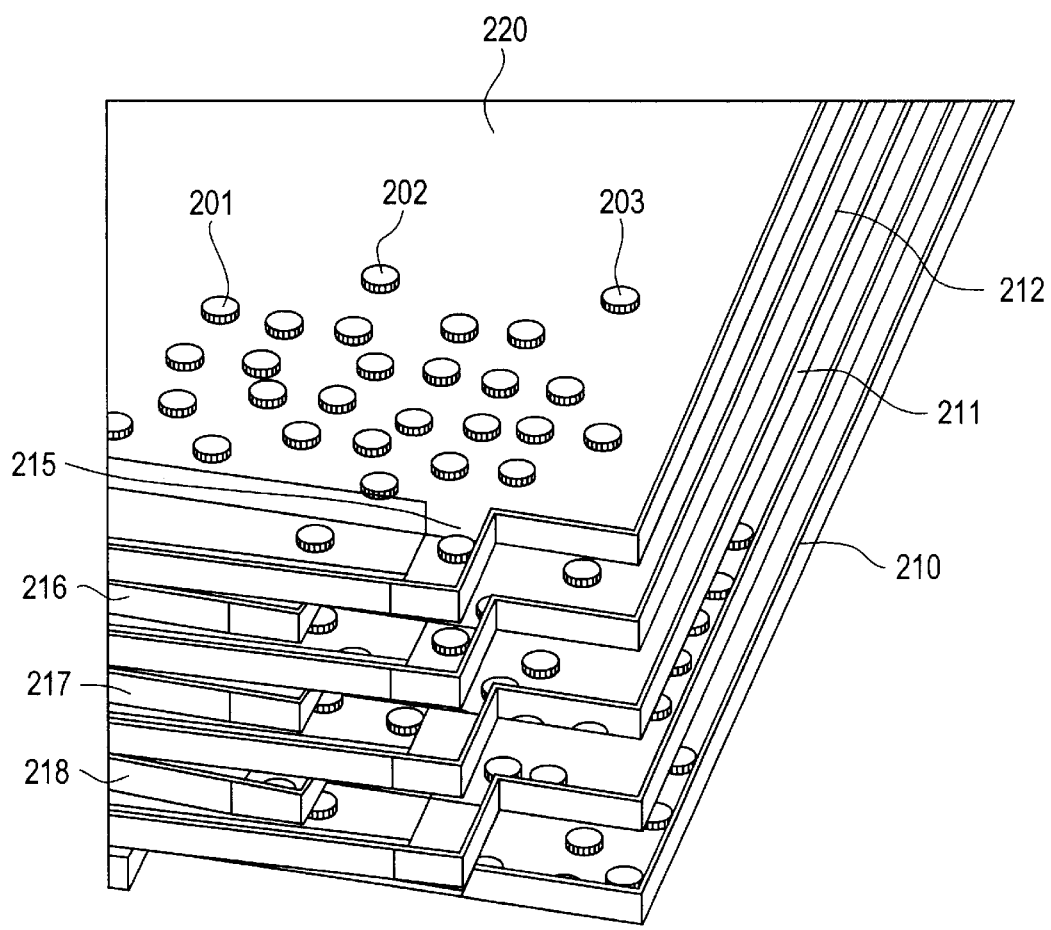
FIG. 7 is a perspective view of mobile inventory trays populating multiple vertical floor levels within a factory space according to one embodiment of the present invention.

Referring now to FIG. 7 there is shown is a perspective view of mobile inventory trays populating multiple vertical floor levels within a factory space according to one embodiment of the present invention. Mobile inventory trays 201, 202, 203, etc., are located and free to move about on all vertical floor levels 210, 211, 212, etc., within the factory space of a multi-floor inventory storage area 220. Floor enclosure openings 215 and ramp access 216, 217, 218, etc., is provided on every vertical floor level 210, 211, 212, so that the mobile inventory trays 201, 202, 203, etc. may move freely from floor to floor. Check-in stations and pack stations (not shown in this view) may be located on one floor level 210 or every floor level 211, 212, etc., depending on the configuration of the facility.

Figure 8:
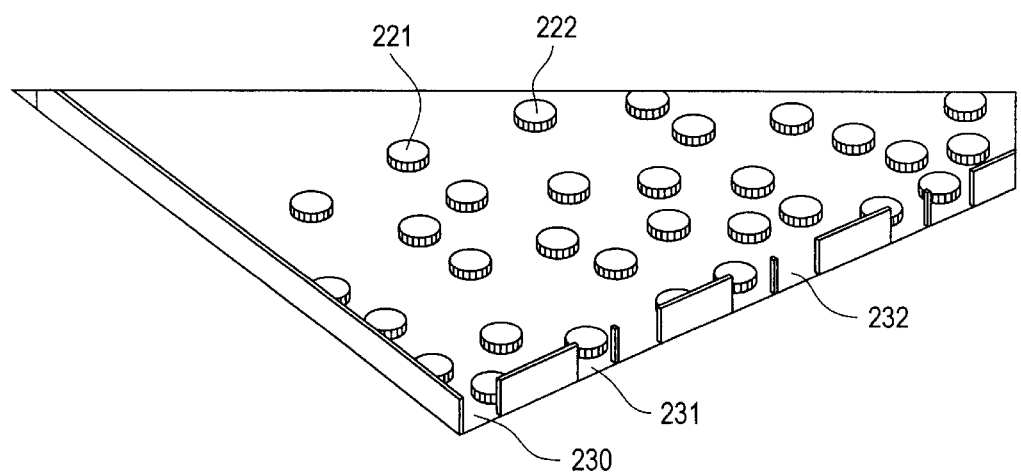
FIG. 8 is a perspective view of mobile inventory trays on a factory floor showing openings in the floor enclosure according to one embodiment of the present invention.

Referring now to FIG. 8 there is shown a perspective view of mobile inventory trays on a factory floor showing openings in the floor enclosure according to one embodiment of the present invention. In the embodiment illustrated by FIG. 8, mobile inventory trays 221, 222, etc., move through floor enclosure openings 230, 231, 232, etc. to gain access to pack stations, check-in stations etc. Ramps may be provided (see FIG. 7) for the mobile inventory trays 221, 222, etc., to move in any direction necessary including up and down the ramps to other inventory floor levels. In this way, mobile inventory trays 221, 222, etc., can respond to pick requests and move to pack station locations (not shown in this view) to fill orders. The mobile inventory trays may also move to other inventory floor levels using other types of mechanisms as well (e.g., elevators).

There are several different embodiments by which mobile autonomous inventory trays can be used to facilitate inventory management. Two such embodiments are described as fixed drive units and detachable drive units. In the detachable drive unit embodiment of the present invention, the drive mechanism is a detachable unit described as a mobile drive unit that can dock and undock with movable inventory trays as needed to carry out inventory movement requests. The movable inventory trays remain motionless until such time as a mobile drive unit docks with a movable inventory tray and moves it through the inventory picking process and releases it into a storage location. The mobile drive units may place the movable inventory trays down in an organized virtual layout such that other mobile drive units can locate the trays. Movable inventory trays may be stacked to form inventory pods that are moved by the mobile drive units. Another characteristic of the detachable drive unit embodiment is that mobile drive units may send and receive instruction messages in a broadcast fashion over a typical wireless network and may still communicate in a peer-to-peer fashion for such things as collision avoidance.

In the embodiment of the invention described in FIGS. 1 through 8 herein, the description refers generally to the fixed drive unit embodiment. FIGS. 9 through 15 refer generally to the detachable drive unit embodiment.

Figure 9A:
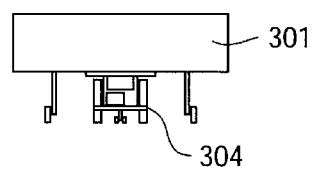
FIGS. 9A–9C are a side view and first and second perspective views of movable inventory trays and detachable mobile drive units according to one embodiment of the present invention.
Figure 9B:
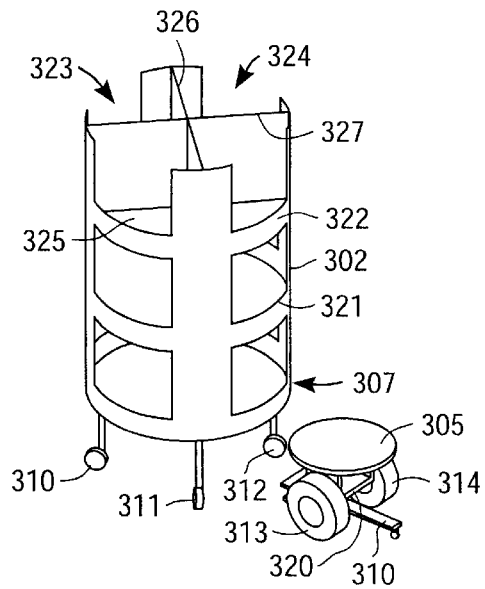
Figure 9C:
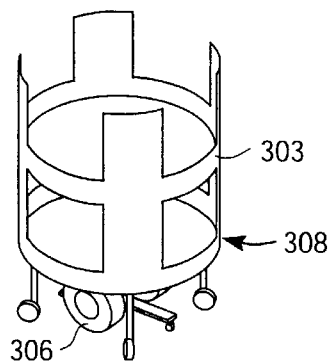

Referring now to FIGS. 9A–9C there is shown a side view and first and second perspective views of movable inventory trays and detachable mobile drive units according to one embodiment of the present invention. The movable inventory trays or "pods" 301, 302, and 303 are designed so that they may be moved about on a factory floor or other type of surface by detachable, mobile drive units 304, 305, and 306. The mobile drive units 304, 305, and 306 may use a docking mechanism to dock to base trays 301, 307, and 308 of the movable inventory pods 301, 302, and 303, using a docking mechanism (not shown in this view) located on the bottom of the base trays 301, 307, and 308. Although the embodiments illustrated by FIGS. 9A–9C show the mobile drive units 304 and 306 docked to the base 301, 307, and 308, a whole variety of docking mechanisms may be employed.

The control units for the mobile drive units 304, 305, and 306 may be contained within a housing 320 secured to the mobile drive units 304, 305, and 306 by conventional means. The control unit may be implemented as a microcontroller-based device, or other electromechanical system and may contain the components described in FIG. 3 herein. As is described in more detail in FIG. 3, the control unit for each mobile drive unit 304, 305, and 306 includes a communication link coupled to a processor and a power unit coupled to a drive mechanism configured to move the mobile drive units about the warehouse in response to control signals of the processor. The mobile drive units 304, 305, and 306, receive command signals via this communication link. For example, the command signals may be transmitted by one or more pack stations (not shown in the view) responsive to an order request issued by the MHS.

The movable inventory pods 301, 302, and 303, are simply stationary units on casters 310, 311, 312, etc., that do not have the drive capability and control electronics necessary to move about on the factory floor without the assistance of the mobile drive units 304, 305, and 306. As in the previous embodiments disclosed herein, casters 310, 311, 312, etc., roll freely and balance the movable inventory pods 301, 302, and 303 as they are moved along a floor surface by the driving wheels 313, 314, etc., of the mobile drive units 304, 305, and 306. In other embodiments, casters 310, 311, 312, etc., may be replaced by fixed wheels, roller ball-type bearings or other conventional means for rolling the movable inventory pods across a floor.

The mobile drive units 304, 305, and 306 navigate the factory floor autonomously using information obtained from their on-board GPS and RF communication systems in an exemplary embodiment. The autonomous mobile drive units 304, 305, and 306, integrate with a MHS in the same way that the mobile inventory trays communicate with the MHS, except that the mobile drive units 304, 305, and 306 may contain additional RAM or other storage and computational circuits to perform more extensive calculations and docking procedures.

The movable inventory pods 301, 302, and 303 may be configured as vertically stackable trays, with each stackable tray 321, 322, etc., joined in an interlocked stack to create the pod. The stack height of the stackable trays is limited by the material and structural characteristics of the base trays 301, 307, and 308, operator picking ergonomics and the ability of the mobile drive units 304, 305, and 306 to effectively transport the movable inventory pods 301, 302, and 303 on the factory floor. Each stackable tray 321, 322, etc., may be further sub-divided into bins 323, 324, 325, etc., for the storage of small parts and/or slow-moving products that require only a few units of inventory. The partitions 326, 327, etc., creating the bins 323, 324, 325, etc., may be removable and reconfigurable. In addition, the movable inventory pods 301, 302, and 303 may have molded parts made of plastic or some other suitable material conventionally designed to facilitate positive locating, docking of the mobile drive units 304, 305, and 306, and transfer of force during movement on the factory floor.

Figure 10:
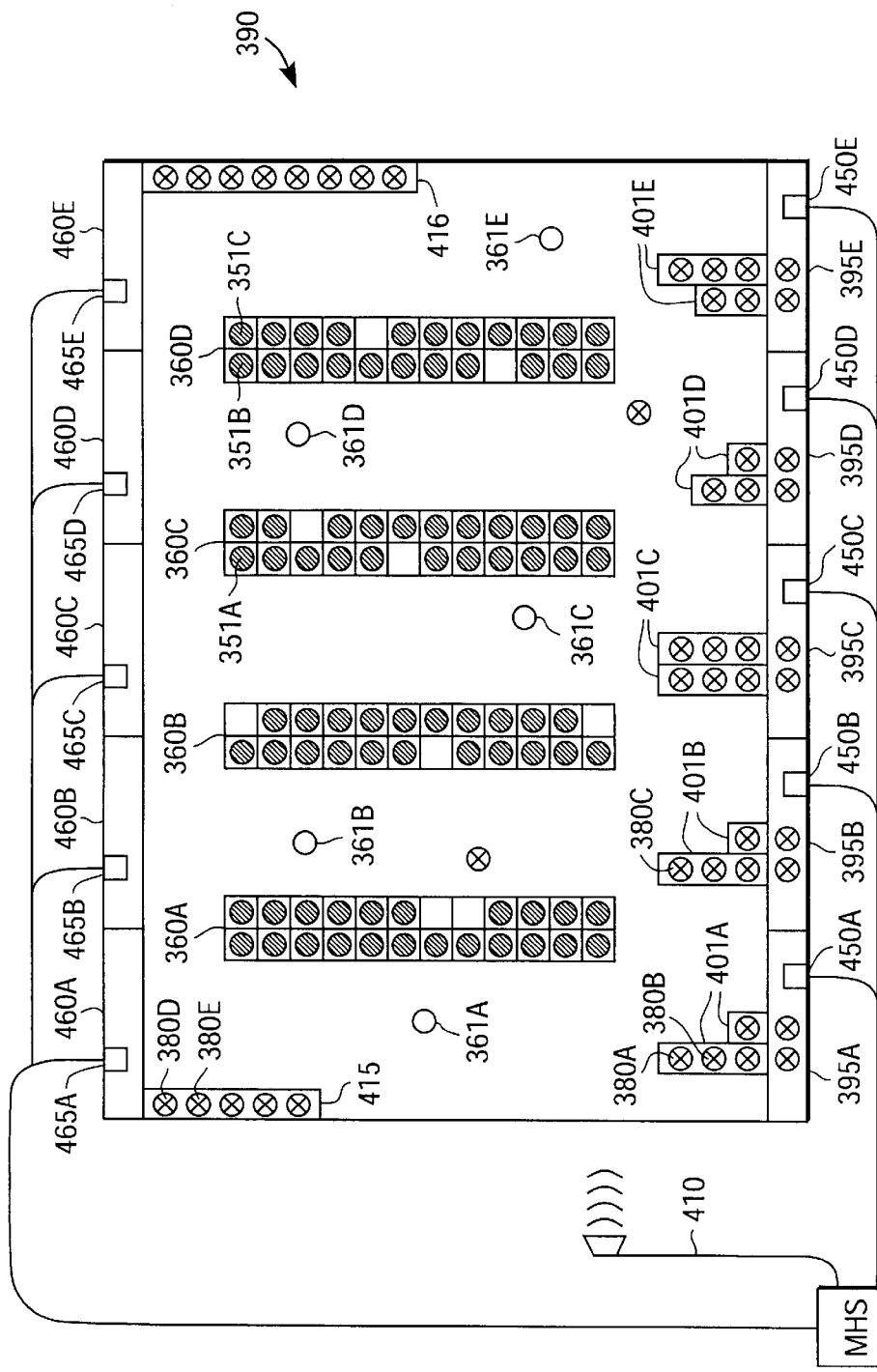
FIG. 10 is a top view showing movable inventory trays arranged in a cellular grid with support lanes and queue locations on a factory floor according to one embodiment of the present invention.

Referring now to FIG. 10 there is shown a top view showing movable inventory pods arranged in a virtual cellular grid with support lanes and queue locations on a factory floor according to one embodiment of the present invention. The movable inventory pods 351 may be organized in a virtual grid 360 on the factory floor 390 so that they may be easily located by the mobile drive units 361. The position of the movable inventory pods 351 on the factory floor, however, are not typically predetermined or fixed by a system computer/controller. Mobile drive units will typically store pods in the closest available storage grid from their current location without regard to any overall inventory layout plan. At other times, the system controller may direct a mobile drive unit to move a pod to a location farther from the pack stations since it does not get called upon frequently for example. The term "virtual" is used to indicate that the grid is only a mathematical construct and that no markings, guides, or fixed hardware is used on the active factory floor area. There may be many more movable inventory pods 351 than mobile drive units 361 located on a given factory floor. For example, there may be 10,000 movable inventory pods on a factory floor and only 2,000 mobile drive units. This configuration achieves a high inventory storage density while using few mobile drive units. Of course, the ratio of movable inventory pods to mobile drive units may vary depending on the configuration and requirements of the operation.

Movable inventory pods 351 dwell in storage grids 360 on the active factory floor 390. The mobile drive units 361 are located in random locations on the factory floor 390 and may communicate with each other and with the MHS 400 wirelessly about the movable inventory pods 351 they are carrying and about the moves they are making. The mobile drive units 361 may also communicate position coordinates and/or changes in the storage locations of the movable inventory pods 351 on the factory floor 390 to peer mobile drive units, such that all of the mobile drive units 361 on the factory floor 390 may receive and store the changing coordinates of the movable inventory pods 351. In this way, the mobile drive units 361 keep a mental mapping of the current position of all inventory on the active floor area. In the alternative, the mobile drive units 361 may communicate changes and/or position coordinates of movable inventory pods 351 directly to the MHS 400 via the wireless network 410. The MHS 400 may then, in turn, inform all of the mobile drive units 361 about these changes and/or position coordinates via the wireless network 410 and may store this location information in a central MHS database.

If a movable inventory pod contains an item(s) needed by one of the pack stations 395 a pack station computer 450 chooses an appropriate mobile drive unit to transport the movable inventory pod to the pack station so that an operator may remove the requested item(s) from the movable inventory pod. As multiple orders are processed, mobile drive units docked to movable inventory pods 380 form orderly queues 401 at the pack stations 395 by communicating with each other globally via the wireless network 410 and locally via built-in infrared (IR) type communications. In this manner, movable inventory pods 380 may reorganize such that earlier order requests may move ahead in the queues. The mobile drive units docked to movable inventory pods 380 may rotate to orient the movable inventory pods accordingly to assist operators at the pack stations 395 in locating the correct item(s) of inventory.

Once an item(s) of inventory has been removed from a movable inventory pod and scanned across a barcode scanner attached to the pack station computer 450, the pack station computer notifies that mobile drive unit docked to a movable inventory pod 380 through a wireless communication that it is free to return the movable inventory pod to the closest possible available storage location among the storage grids 360 located on the factory floor 390. In this manner, the item(s) of inventory that are most commonly requested migrate to the front areas of the factory floor 390, maximizing the efficiency of the material handling system.

Mobile drive units docked to empty movable inventory pods 380, or pods containing at least one empty bin, and/or docked to movable inventory pods that may need particular item(s) of inventory to be replenished form orderly queues 415 and 416 along the sides of the factory floor area 390 to await the assignment and loading of new item(s) of inventory at check-in stations 460. Empty movable inventory pods 380 may accept any new item(s) of inventory that the operators at the check-in stations 460 see fit. Empty movable inventory pods 380 are not dedicated to particular item(s) of inventory. An operator at the check-in stations 460 may use a barcode scanner or some other device attached to computers 465 at the check-in stations 460 to scan and identify an item(s) of inventory and to scan the movable inventory pod/bin to make the association as the item is being placed in a movable inventory pod. An operator at the check-in stations 460 may indicate the quantity of the item(s) being placed in the movable inventory pod. The computers 465 at the check-in stations 460 may communicate wirelessly with mobile drive units transporting the movable inventory pods as to when to move into and out of the check-in stations 460 to replenish empty movable inventory pods 380. In addition, once the check-in process is completed, the computers 465 at the check-in stations transmit the type and quantity of units of inventory loaded on to the movable inventory pods 380 and other types of information as needed to the MHS 400 and/or to all of the mobile drive units on the factory floor 390 using the wireless network 410.

Each movable inventory pod 351 may contain an embedded wireless RFID chip or some other form of identification that may be used to uniquely identify that movable inventory pod and the item(s) of inventory contained by the movable inventory pod among the thousands of movable inventory pods 351 on the factory floor 390. When the check-in operation is complete, the check-in station computer 465 may wirelessly notify the mobile drive unit that it is free to move the movable inventory pod back to the storage grids 360 located on the factory floor 390. At this point, the mobile drive units are free to transport the movable inventory pods 380 back to the closest available storage location in the storage grids 360.

The mobile drive units 361 may move movable inventory pods 351 to the check-in stations 460 via a response to a wireless request by the computers 465 at the check-in stations. Alternatively, after the mobile drive units docked to the movable inventory pods 380 at the pack stations 395 have dropped off the item(s) of inventory, they may move immediately to check-in stations 460 if the mobile drive units determine that bins in the movable inventory pods are empty and/or have depleted to a certain predetermined level.

In yet another embodiment, a centralized computer, such as the MHS 400, may track the position coordinates of the movable inventory pods 380 and the mobile drive units 361 using the wireless network. The MHS 400 may also store information about the particular items of inventory contained in each movable inventory pod in memory, or a central database. For example, the MHS 400 may receive an order request for an item of inventory. Instead of transmitting this request to a pack station computer 450, the MHS 400 may itself use algorithms and software processes to select a particular mobile drive unit 361 to fulfill the order request at a particular pack station 395. The algorithm may instruct the MHS 400 to choose the mobile drive unit 361 to fulfill the order request based on the proximity of a mobile drive unit 361 to a particular movable inventory pod 380 that contains the item of inventory in the order request. Other types of algorithms may be used to determine the mobile drive unit 361 selection processes. It should also be appreciated that the MHS 400 may also select the particular pack station 395 based on an algorithm. The pack station 395 may be selected either before or after the MHS 400 selects the mobile drive unit 361 to fulfill the order.

MHS 400 may transmit the request to the mobile drive unit 361 using the wireless network 410. The mobile drive unit 361 then transports the movable inventory pod 380 to the pack station 395 to fulfill the order request. The mobile drive unit 361 may move under its own direction using its control electronics as previously described herein. Mobile drive unit 361 may still communicate with peer mobile drive units for various purposes. For example, peer-to-peer communication between mobile drive units 361 may be utilized to avoid congestion on the factory floor 390 and/or to effectively navigate into queuing positions 401 at pack stations 395 and/or check-in stations 460.

Once an item of inventory has been removed from the movable inventory pod 380 at the pack station 395, mobile drive unit 361 may be notified, either by a computer 450 at pack station 395 or by MHS 400, that it is free to return movable inventory pod 380 to a storage location in virtual grid 360 of factory floor 390. MHS 400 may determine an optimum location for movable inventory pod 380 on factory floor 390. For example, MHS 400 may plan and optimize storage by directing the movement of less utilized movable inventory pods 380 to locations farther away from pack stations 395 and check-in stations 460.

MHS 400 may also be used to control and direct requests for the replenishment of items of inventory. These requests may be transmitted wirelessly to MHS 400 from check-in station computers 465 or may come from the WMS (not shown). MHS 400 may determine an appropriate mobile drive unit 361 and movable inventory pod 380 to fulfill the order according to an algorithm or by some other method. Once MHS 400 selects the mobile drive unit 361 to fulfill the order, the mobile drive unit 361 moves an empty movable inventory pod 380 to the appropriate check-in station 460. After the item of inventory has been replenished, mobile drive unit 361 may be instructed by the MHS 400 to return the movable inventory pod 380 back to virtual grid 360 in the manner described herein.

MHS 400 may continually poll the entire population of mobile drive units 361 for position coordinate information using the wireless network. In addition, each mobile drive unit may transmit its position coordinates in regular intervals, for example every minute, to MHS 400 using the wireless network. In this manner, MHS 400 can maintain current location information about mobile drive units 361 and movable inventory pods 380 and may determine the most efficient mobile drive units 361 to fulfill each order request.

Figure 11:
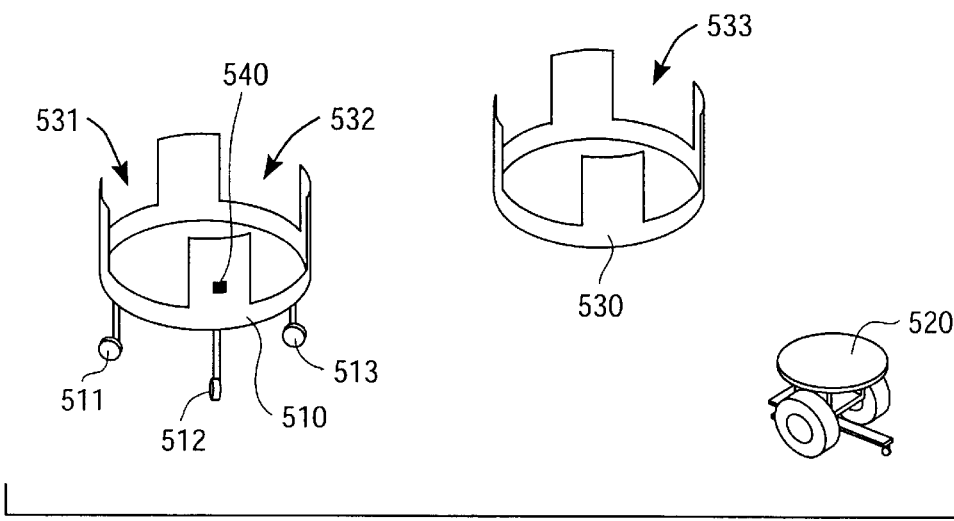
FIG. 11 is a three-part movable inventory tray including a base tray, a stack tray, and a mobile drive unit according to one embodiment of the present invention.

Referring now to FIG. 11 there is shown a three-part movable inventory pod including a base tray, a stack tray, and a mobile drive unit according to one embodiment of the present invention. A base tray 510 is used in the first (lowest) position. The base tray 510 includes casters 511–513, and interfaces with the mobile drive unit 520. Base tray 510 may also include an RFID chip 540 embedded in base tray 510. Mobile drive unit 520 docks to base tray 510 to move the movable inventory pod through specific inventory tasks and to release the movable inventory pod back into storage locations. Mobile drive unit 520 interrogates the RFID chip 540 during docking to ensure pick up of the correct movable inventory pod. Moreover, when mobile drive unit 520 is docked to the movable inventory pod, mobile drive unit 520 identifies the orientation of all of the "pickable" openings 531, 532, etc., in the movable inventory pod such that it can align the correct opening 531, 532, etc., toward the operator in the pack stations and/or check-in stations. A stack tray unit 530 is designed to sit on top of base tray 510 and/or other stack trays, thus creating movable inventory pods with multiple stackable trays. The stack trays may also include RFID chips for unique identification by the mobile drive units.

Figure 12:
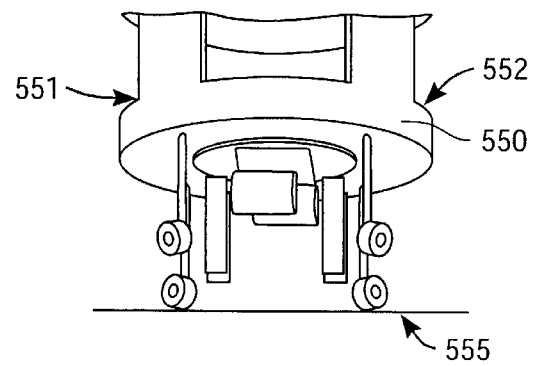
FIG. 12 is a mobile drive unit docked to a base tray according to one embodiment of the present invention.

Referring now to FIG. 12 there is shown a mobile drive unit docked to a base tray according to one embodiment of the present invention. In this particular embodiment, as the movable inventory pod 550 moves along a factory floor 555 it occupies a path three feet wide. The inner diameter of the storage compartment 551 may be slightly smaller than the three-foot outer diameter based on the wall 552 thickness. The storage compartment height of the base tray may be 15 inches. This particular geometry yields a payload capacity of approximately 14,800 cubic inches in this particular embodiment.

The height of the base tray 550 above the factory floor 555 determines the location of the pick openings and thus the reaching and bending of the operators at the pack stations and/or check-in stations. With a floor clearance between 15 and 26 inches above the surface of the factory floor 555, and a pod consisting of 2 or 3 trays, a top pick opening may typically be between 49 and 60 inches. The openings may be 15 inches wide by 11 inches tall. This particular movable inventory pod 550 may accept up to 200 pounds of inventory. Items of inventory may range from very small objects, such as a pack of gum or nail polish, to larger items such as an eight-pack of paper towels or a VCR. Other embodiments may utilize trays in very different configurations, designed for vastly different payloads.

Figure 13:
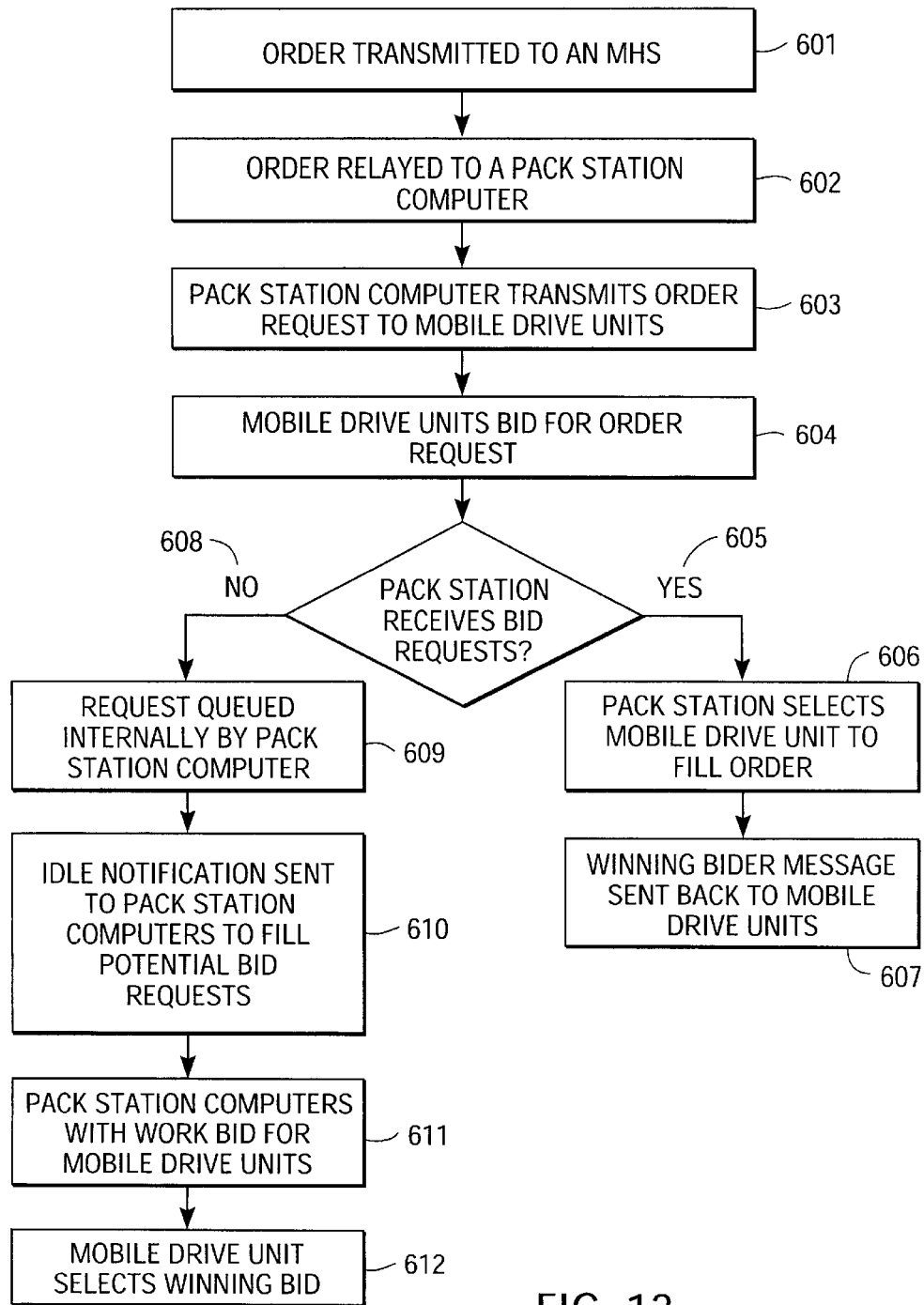
FIG. 13 is a flow chart illustrating a mobile drive unit selection process to fill an order request according to one embodiment of the present invention.

Referring now to FIG. 13 there is shown a flow chart illustrating a mobile drive unit selection process to fill an order request according to one embodiment of the present invention. An order is transmitted from a WMS to the MHS (block 601). The MHS then relays the order to a pack station computer (block 602) according to specified load leveling algorithms. The pack station computer transmits the order request for items of inventory to the entire population of mobile drive units located on the factory floor via the wireless network (block 603). The mobile drive units respond to the order request with bids that represent the amount of time each mobile drive unit calculates it would take to deliver the requested item (block 604). If the packs station computer receives bids from one or more mobile drive units (block 605), the pack station computer will fill the request by selecting the mobile drive unit that bids the shortest amount of time (block 606). A winning bidder message is broadcast back to the entire mobile drive unit population by the pack station controller (block 607) such that the losing mobile drive units may delete the open bid and respond to other requests. This process may be handled in an alternative fashion whereby the MHS maintains the status of all mobile drive units and movable inventory pods and centrally calculates and assigns mobile drive unit activities to include which drive is to transport which pod from which location and later, into which location to replace the pod.

If the pack station computer does not receive a bid from one or more mobile drive units (block 608), this means there are no idle mobile drive units available. The pack station computer will then queue the request internally until it hears from an idle mobile drive unit (block 609). When a mobile drive unit becomes idle, it will broadcast that message to the pack station computers in the event that there is an open item request requiring a mobile drive unit (block 610). All pack station computers that have work bid for the use of the mobile drive unit (block 611). The mobile drive unit selects the winning pack station based on the age of the request (block 612) or by some other selection formula.

Figure 14:
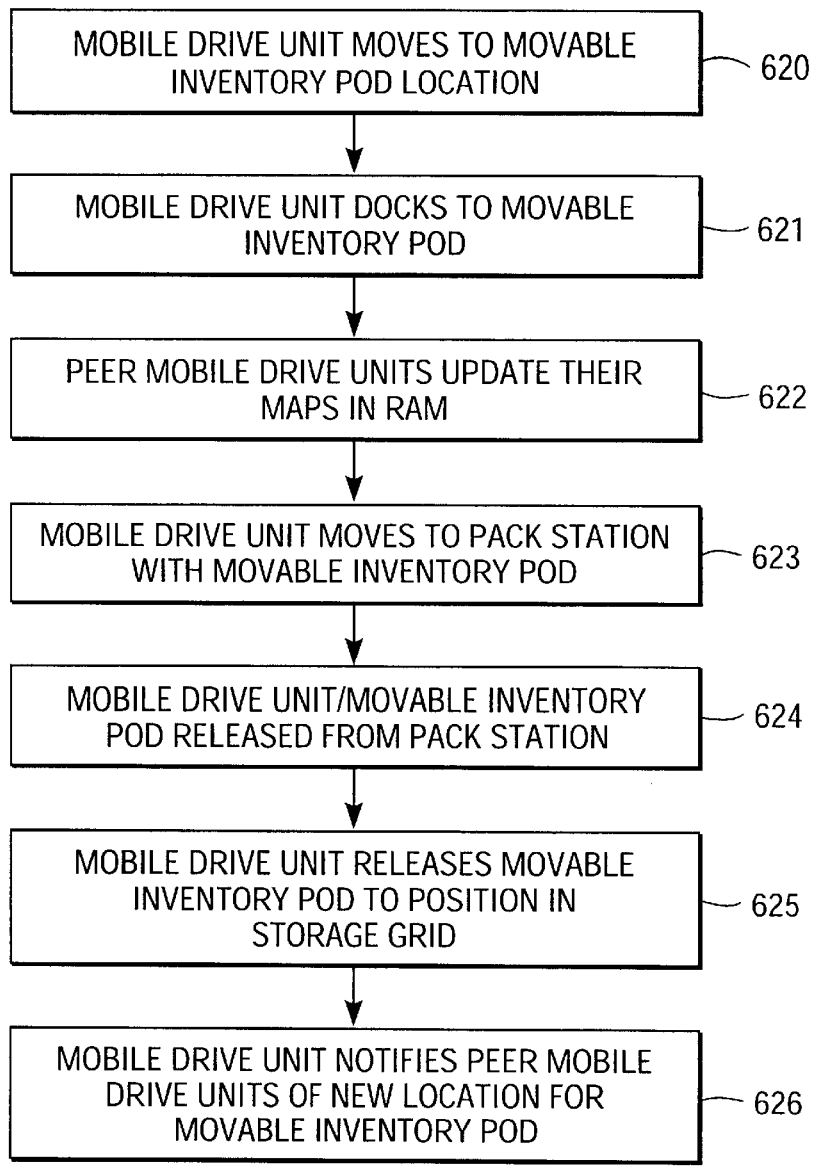
FIG. 14 is a flow chart illustrating an order fill process using autonomous mobile drive units and movable inventory trays according to one embodiment of the present invention.

Referring now to FIG. 14 there is shown a flow chart illustrating an order fill process using autonomous mobile drive units and movable inventory pods according to one embodiment of the present invention. Once a mobile drive unit has been notified that it has been selected by a pack station computer to fill an order request, the mobile drive unit reserves that movable inventory pod with a wireless message to peer drive units and moves to the location of the movable inventory pod containing the requested item(s) of inventory (block 620) and docks with the movable inventory pod (621). The peer mobile drive units update there maps in RAM with this information (block 622) at this point, or earlier when the reservation was made against the movable inventory pod. The mobile drive unit moves to the pack station with the movable inventory pod (block 623). An operator at the pack station removes the item(s) of inventory from the movable inventory pod.

Once the item(s) have been scanned by the operator, the mobile drive unit docked to the movable inventory pod is released from the pack station (block 624). Using its internal map of open storage locations in the storage grid, the mobile drive unit reserves an open storage location with a wireless message to peer mobile drive units, then proceeds to that location and undocks from the movable inventory pod (block 625) and upon completion notifies the peer mobile drive units of the new storage location of the movable inventory pod (block 626).

Figure 15:
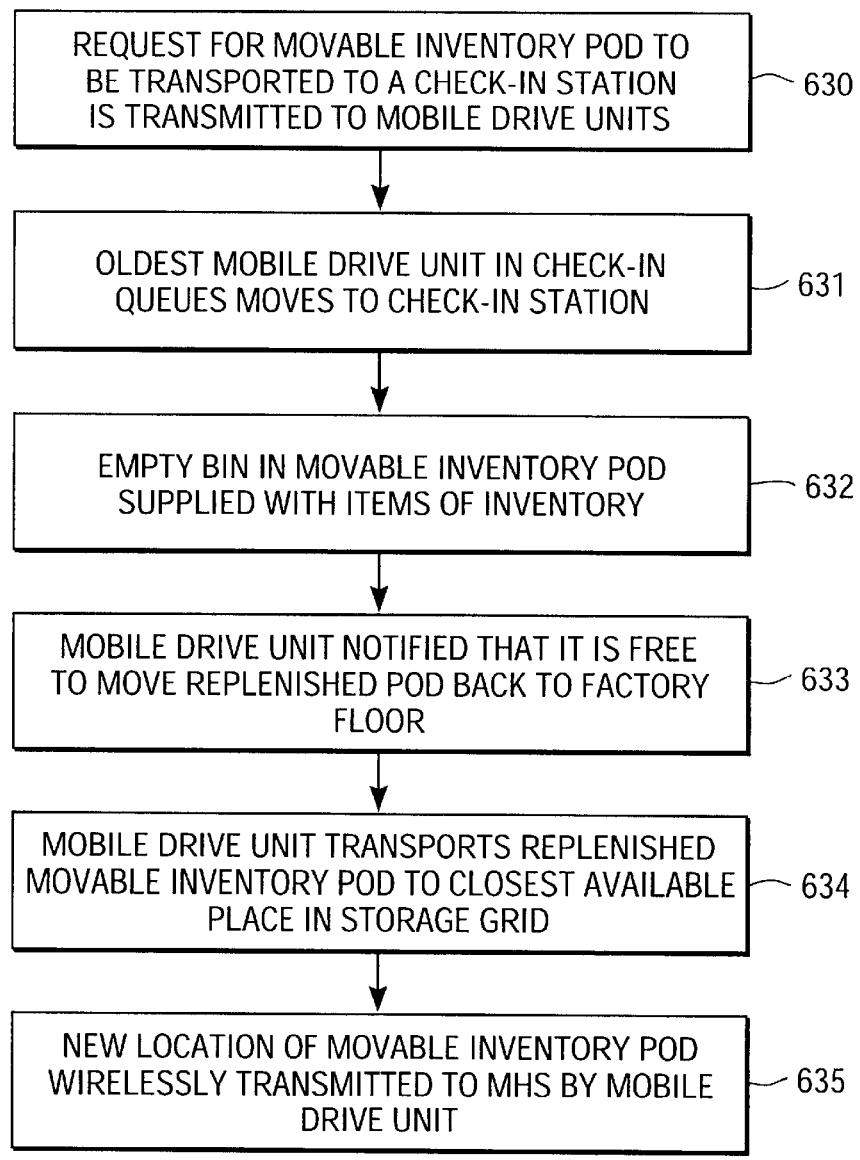
FIG. 15 is a flow chart illustrating an inventory replenishment process using autonomous mobile drive units and movable inventory trays according to one embodiment of the present invention.

Referring now to FIG. 15 there is shown a flow chart illustrating an inventory replenishment process using autonomous mobile drive units and movable inventory pods according to one embodiment of the present invention. A request for a movable inventory pod containing at least one empty bin to be transported to a check-in station is transmitted by a check-in station computer to all of the mobile drive units currently docked to pods containing an empty bin and located in the check-in queue lanes on either side of the factory floor (block 630). The oldest mobile drive unit in the queue lanes responds to the request by moving to the check-in station (block 631). An operator at the check-in station supplies an empty bin in the movable inventory pod with item(s) of inventory (block 632) and the check-in station computer then notifies the mobile drive unit that it is free to move the replenished movable inventory pod back to the factory floor (block 633). The mobile drive unit transports the replenished movable inventory pod to the closest available place in the storage grid on the factory floor (block 634) and wirelessly transmits to the MHS and peer drive units the new location of the movable inventory pod (block 635).

In the foregoing, a material handling system and method using autonomous mobile drive units and movable inventory pods has been disclosed. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalent.

I claim:

1. A method for managing items of inventory in a warehouse comprising:
   sending a request signal from a computer, the request signal specifying an item of inventory;
   receiving the request signal by a mobile drive unit (MDU), the MDU responding to the request signal by:
      determining a location of a movable inventory pod (MIP) that contains the item of inventory;
      energizing a drive mechanism of the MDU to move the MDU to the location of the MIP;
      docking the MDU to the MIP;
      energizing the drive mechanism of the MDU to transport the MIP to a station of the warehouse.

2. The method of claim 1 wherein the station comprises a pack station.

3. The method of claim 1 wherein the MIP comprises one of a plurality of MIPs located in the warehouse.

4. The method of claim 1 wherein sending is performed via wireless transmission.

5. The method of claim 1 wherein the MDU comprises a random-access memory (RAM) that stores data that includes position coordinates of the MIPs and the items of inventory contained in the MIPs.

6. The method of claim 5 wherein the MDU further comprises a processor used to calculate movements and process communication messages.

7. The method of claim 1 further comprising:
   generating position signals by a guidance system of the MDU; and
   navigating a path to the MIP using the position signals.

8. The method of claim 7 further comprising navigating a path to the station using the position signals generated by the guidance system.

9. The method of claim 1 further comprising storing the items of inventory in a plurality of MIPs located in the warehouse.

10. The method of claim 1 wherein the MIPs are configured as vertically stackable trays, each tray containing one or more items of inventory.

11. The method of claim 10 wherein each tray may be subdivided into bins.

12. The method of claim 1 further comprising:
   storing the plurality of MIPs in a virtual grid on a floor of the warehouse;
   embedding a radio frequency identification (RFID) chip in each of the MIPs, the RFID chip identifying a unique MIP and the items of inventory contained in each MIP.

13. A computerized method for managing items of inventory in a warehouse comprising:
   transmitting a request signal from a computer, the request signal specifying an order for an item of inventory;
   receiving the request signal by a plurality of mobile drive units (MDUs) located in the warehouse, each of the MDUs including a processor coupled to a random-access memory (RAM) that stores position coordinates of a plurality of movable inventory pods (MIPs) and a list of inventory items contained in each of the MIPs;
   selecting a particular MDU to fulfill the order;
   driving the MDU to the location of a MIP that contains the item of inventory;
   docking the particular MDU with the MIP;
   driving the particular MDU to transport the MIP to a pack station.

14. The computerized method of claim 13 wherein the selecting of a particular MDU comprises:
   determining by each of the MDUs an estimated time duration to transport a movable inventory pod containing the item specified in the order to the pack station.

15. The computerized method of claim 14 further comprising:
   transmitting by each of the MDUs, the estimated time duration to the pack station; and
   identifying the particular MDU to fulfill the order request based on a shortest estimated time duration.

16. The computerized method of claim 13 further comprising:
   transmitting an availability signal to the pack station.

17. The computerized method of claim 13 wherein the pack station comprises one of a plurality of pack stations, each of which transmits request signals specifying an order for items of inventory to the MDUs, and further comprising:
   selecting, by an idle MDU an order from a particular pack station according to a priority algorithm.

18. The computerized method of claim 13 wherein the transmitting is performed via wireless transmission.

19. The computerized method of claim 13 wherein the MDU comprises a random-access memory (RAM) that stores data that includes position coordinates of the MIPs and the items of inventory contained in the MIPs.

20. The computerized method of claim 19 wherein the MDU further comprises a processor used to calculate movements and process communication messages.

21. The computerized method of claim 13 further comprising:
   generating position signals by a guidance system of the MDU; and
   navigating a path to the MIP using the position signals.

22. The computerized method of claim 21 further comprising navigating a path to the pack station using the position signals generated by the guidance system.

23. The computerized method of claim 13 further comprising storing the items of inventory in a plurality of MIPs located in the warehouse.

24. The computerized method of claim 13 wherein the MIPs are configured as vertically stackable trays, each tray containing one or more items of inventory.

25. The computerized method of claim 13 further comprising:
storing the plurality of MIPs in a virtual grid on a floor of the warehouse;
embedding a radio frequency identification (RFID) chip in each of the MIPs, the RFID chip identifying a unique MIP and the items of inventory contained in each MIP.

26. The computerized method of claim 13 further comprising:
removing the item of inventory from the MIP at the pack station;
moving the MDU to return the MIP to an available storage location;
returning the MIP to an available storage location in the warehouse;
undocking the MDU from the MIP.

27. The computerized method of claim 13 further comprising:
moving the MDU to a check-in station;
replenishing items of inventory to the MIP at the check-in station;
returning the MIP to an available storage location in the warehouse;
undocking the MDU from the MIP.

28. A method for managing items of inventory in a warehouse comprising:
sending a request signal from a Material Handling System (MHS) to a computer at a pack station in a warehouse, the request signal specifying an item of inventory;
receiving the request signal by a plurality of mobile drive units (MDUs) located in the warehouse, each of the MDUs including a processor coupled to a random access memory (RAM) that stores position coordinates of a plurality of movable inventory prods (MIPs) and a list of inventory items contained in each of the MIPs;
determining by each of the MDUs an estimated time duration to transport a MIP containing the item specified in the request signal;
selecting by the computer at the pack station a MDU to fulfill the order based on the shortest estimated time duration;
driving the MDU to the location of a MIP that contains the item of inventory;
docking the MDU with the MIP;
driving the MDU to transport the MIP to a pack station.

29. The method of claim 28 wherein the selecting is performed via wireless transmission.

30. The method of claim 28 wherein the pack station comprises one of a plurality of pack stations, a computer at each of the pack stations transmitting a request signal to the plurality of MDUs via wireless transmission.

31. The method of claim 28 wherein the MDU comprises a random-access memory (RAM) that stores data that includes position coordinates of the MIPs and the items of inventory contained in the MIPs.

32. The method of claim 28 wherein the MDU further comprises a processor used to calculate movements and process communication messages.

33. The method of claim 28 wherein the MIPs are configured as vertically stackable trays, each tray containing one or more items of inventory.

34. The method of claim 28 further comprising:
generating position signals by a guidance system of the MDU; and
navigating a path to the MIP using the position signals.

35. The method of claim 34 further comprising navigating a path to the pack station using the position signals generated by the guidance system.

36. The method of claim 28 further comprising:
storing the plurality of MIPs in a virtual grid on a floor of the warehouse;
embedding a radio frequency identification (RFID) chip in each of the MIPs, the RFID chip identifying a unique MIP and the items of inventory contained in each MIP.

37. The method of claim 28 further comprising:
removing the item of inventory from the MIP at the pack station;
moving the MDU to return the MIP to an available storage location;
returning the MIP to an available storage location in the warehouse;
undocking the MDU from the MIP.

38. The method of claim 28 further comprising:
moving the MDU to a check-in station;
replenishing items of inventory to the MIP at the check-in station;
returning the MIP to an available storage location at the warehouse;
undocking the MDU from the MIP.

39. The method of claim 28 further comprising communicating information among peer MDUs using the wireless network.

40. The method of claim 39 wherein the information includes coordinate information for each of the MDUs and information about inventory items stored in particular MIPs.

41. The method of claim 28 further comprising transmitting information to the MHS by one or more of the MDUs using the wireless network, the information including coordinate information for each of the MDUs and information about inventory items stored in particular MIPs.

42. The method of claim 41 further comprising:
receiving the information by the MHS; and
transmitting the information received from the one or more of the MDUs to the plurality of the MDUs using the wireless network.

43. A computer-implemented method for managing items of inventory in a warehouse comprising:
transmitting position coordinates of one or more movable inventory pods (MIPs) and one or more mobile drive units (MDUs) to a computer;
receiving, by the computer, an order request for an item of inventory;
selecting, by the computer, a particular MDU to fulfill the order request;
transmitting the order request to the particular MDU;
docking the particular MDU to an MIP containing the item of inventory; and
moving, by self-power of the particular MDU, the MIP to a pack station located in the warehouse.

44. The method of claim 43 wherein transmitting the order request is performed via wireless transmission.

45. The method of claim 43 wherein selecting a particular MDU from the one or more MDUs is performed via a software algorithm in the computer.

46. The method of claim 43 further comprising:
receiving information by a particular MDU from an RFID chip embedded in each MIP, the information identifying items of inventory contained by each MIP; and
transmitting the information by the MDU to the computer via a wireless network.

47. The method of claim 43 further comprising:
removing the item of inventory from the MIP at the pack station;
directing the MDU to return the MIP to an available storage location;
returning the MIP to an available storage location in the warehouse;
undocking the MDU from the MIP.

48. The method of claim 43 further comprising storing the MIPs in a virtual grid on a factory floor.

49. The method of claim 48 wherein the returning of the MIP to an available storage location comprises determining an optimum storage location for the MIP in the virtual grid according to an algorithm stored in the computer.

50. The method of claim 43 further comprising:
receiving a request to replenish an item of inventory by the computer;
transmitting the request to a MDU selected by the computer;
moving the MDU to a check-in station; and
replenishing the item of inventory in a MIP docked to the MDU at the check-in station.

51. The method of claim 43 further comprising communicating in a peer-to-peer fashion between each of the MDUs to form queues and to avoid traffic congestion on a factory floor.

52. The method of claim 43 further comprising polling the one or more MDUs on a continual basis to determine updated position coordinates of the MDUs.

53. The method of claim 43 further comprising transmitting the location of each MDU by each MDU in regular intervals to the computer to maintain updated position coordinates of each of the MDUs.

* * * * *